(12) United States Patent
Carte et al.

(10) Patent No.: US 7,708,502 B2
(45) Date of Patent: May 4, 2010

(54) SYSTEM AND METHOD FOR STABILIZING LANDSLIDES AND STEEP SLOPES

(75) Inventors: Joseph D. Carte, 26 Bryn Mawr Way, Culloden, WV (US) 25510; John R. Knight, 202 Ferry St., Charleston, WV (US) 25314

(73) Assignees: Joseph d. Carte, Culloden, WV (US); John R. Knight, Charleston, WV (US)

( * ) Notice: Subject to any disclaimer, the term of this patent is extended or adjusted under 35 U.S.C. 154(b) by 707 days.

(21) Appl. No.: 10/990,197

(22) Filed: Nov. 16, 2004

(65) Prior Publication Data
US 2005/0102926 A1 May 19, 2005

Related U.S. Application Data

(60) Provisional application No. 60/523,045, filed on Nov. 17, 2003.

(51) Int. Cl.
*E02D 5/80* (2006.01)
(52) U.S. Cl. .................................. 405/302.4
(58) Field of Classification Search ............. 405/230, 405/302.4, 302.6, 302.1, 288, 259.1, 258.1; 52/166; 248/530, 545, 156
See application file for complete search history.

(56) References Cited

U.S. PATENT DOCUMENTS

| | | | |
|---|---|---|---|
| 2,207,049 A * | 7/1940 | Chance | ........................ 52/166 |
| 4,044,513 A | 8/1977 | Deike | |
| 4,068,445 A | 1/1978 | Bobbitt | |
| 4,923,165 A | 5/1990 | Cockman | |
| 5,017,047 A | 5/1991 | Myles et al. | |
| 5,044,831 A | 9/1991 | Myles et al. | |
| 5,064,313 A | 11/1991 | Risi et al. | |
| 5,181,797 A | 1/1993 | Circeo, Jr. et al. | |
| 5,192,168 A | 3/1993 | Massarsch et al. | |
| 5,622,015 A | 4/1997 | Collins | |

(Continued)

FOREIGN PATENT DOCUMENTS

EP 343913 A2 * 11/1989

(Continued)

OTHER PUBLICATIONS

Koerner, R. M. and Robbins; "In-Situ Stabilization of Siol Using Nailed Geosynthetics"; Third International Conference on Geotextiles; Vienna, Austraia; 1986; pp. 395-400.

*Primary Examiner*—Sunil Singh
(74) *Attorney, Agent, or Firm*—Haynes and Boone, LLP

(57) ABSTRACT

A device for stabilizing slopes having a first plate and a second plate attached to the first plate at a non-perpendicular angle. The second plate is configured to inhibit rotation of the first plate. At least one gusset is disposed on a first side of the second plate and attaches the first plate to the second plate. At least one strut is disposed on a second side of the second plate and attaches the first plate to the second plate. A guide tube is non-pivotally attached to the first plate such that at least one of a rod and an extension of the anchor are rotatable within the guide tube. The guide tube is a hollow cylinder that is completely closed except at the ends thereof.

4 Claims, 11 Drawing Sheets

U.S. PATENT DOCUMENTS

| | | |
|---|---|---|
| 5,797,704 A | 8/1998 | Collins |
| 6,128,867 A | 10/2000 | MacKarvich |
| 6,237,289 B1 | 5/2001 | Jewett et al. |
| 6,279,858 B1 | 8/2001 | Eicher |
| 6,334,281 B1 | 1/2002 | Oliver et al. |
| 6,474,028 B2 | 11/2002 | Cusimano et al. |
| 6,524,027 B1 | 2/2003 | Fabius |
| 6,676,335 B1 * | 1/2004 | Hickman .................... 405/230 |
| 6,719,498 B2 | 4/2004 | Barley |

FOREIGN PATENT DOCUMENTS

| | | | |
|---|---|---|---|
| GB | 2305948 A | * | 4/1997 |

* cited by examiner

US 7,708,502 B2

SYSTEM AND METHOD FOR STABILIZING LANDSLIDES AND STEEP SLOPES

PRIORITY CLAIM

This patent application claims the benefit of the priority date of U.S. Provisional Patent Application Ser. No. 60/523,045 filed on Nov. 17, 2003 and entitled SOIL BOLTING: A SYSTEM OF DEVISES AND METHOD FOR STABILIZING LANDSLIDES AND STEEP SLOPES pursuant to 35 USC 119, the entire contents of which are hereby expressly incorporated by reference.

FIELD OF THE INVENTION

The present invention relates generally to soil stabilization. The present invention relates more particularly to a system and method for stabilizing landsides, steep slopes, and the like, wherein at least one anchor is placed into the ground and a soil bolting device is attached to the anchor.

BACKGROUND OF THE INVENTION

Downhill soil movement, such as that which occurs during landslides and ground creep, can cause substantial damage to various structures such as buildings, highways and railroads. Such damage can have severe economic consequences.

According to one contemporary attempt to mitigate such damage, landslides are excavated, subsurface drains are installed, and the land is then backfilled to form a stable slope. This method is frequently successful with respect to mitigating further undesirable movement of the soil.

However, where structures are involved or where space limitations prevent the use of excavation equipment, then in-place stabilization is generally required. To date, the practice of in-place slope stabilization has generally been limited to the use of retaining walls, buttresses, pilings, and soil nailing techniques.

Conventional retaining walls provide a resisting force by virtue of the stiffness of the wall and resistance of its foundation to overturning and base sliding. The stem of a retaining wall is cantilevered from the foundation and is at a substantial mechanical disadvantage with respect to undesirable potential movement. Thus, such retaining walls typically require an extensive foundation in order to adequately resist failure.

Excavation of soil for an extensive foundation at the base (or toe) of a landslide can remove the precarious support presently available and thus inadvertently mobilize the slide. Tie-back anchors used with retaining walls can reduce, or eliminated, the need for such an extensive foundation. However, expense and space limitations sometimes preclude this option.

Mechanically stabilized earth (MSE) retaining walls rely on the tensile properties and pullout resistance of embedded geogrids, as well as their connection strength to an earth retaining facing. For a MSE wall to provide additional resistance to landslide forces, the wall backfill (with its layers of geogrid tying it together) must be massive enough to act as a gravity wall, thus requiring a large abutting fill. Similarly, a buttress is usually constructed of free-draining rock, and can act as a gravity wall provided that it is massive enough. Both MSE walls and buttresses require significant space and a stable foundation at the toe of the landslide. However, the necessary space and foundation are sometimes not available.

Piling and drill piers can be sized to have the mechanical strength required to resist most downhill movements and do not consume a large area. However, piling and drill piers are relatively costly and require large and expensive installation equipment. Piling and piers can be use in conjunction with tie-back anchors to reduce their structural size. However, expense sometimes preclude this option.

Soil nailing utilizes a relatively large number of rods driven though an unstable soil mass and into a more stable underlying layer, as disclosed in U.S. Pat. No. 6,524,027. Soil nailing provides a holding force by virtue of the soil shear resistance around the individual rods. Soil nailing requires a considerable understanding of soil mechanics and the engineering uncertainty of the magnitudes of the shear resistance around the rods makes design difficult. Although empirical designs have been somewhat successful, such designs are generally undesirable because they do not typically have a known factor of safety.

A unique method of in-situ stabilization using a plasma arc torch to vitrify the soil across the sliding plane is disclosed in U.S. Pat. No. 5,181,797. This method requires that multiple borings be made, through which zones or columns of vitrified soil are formed to provide resistance to movement. The resistance to movement is provided by the soil shear resistance around the individual hardened areas, thereby increasing the overall shear strength of the soil mass in a fashion similar to soil nailing. Consequently, this method also suffers from the engineering uncertainties associated with quantifying the magnitude of the resulting increase in shear strength.

As such, although the prior art has recognized, to a limited extent, the problem of undesirable soil movement, the proposed solutions have, to date, been ineffective in providing a satisfactory remedy wherein space limitations exists. Therefore, it is desirable to provide a soil stabilization system that requires relatively small and inexpensive equipment, that requires no additional space (or land area), and that is relatively inexpensive to perform when compared to the other soil stabilization methods.

BRIEF SUMMARY OF THE INVENTION

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112.

The present invention comprises devices, systems and methods for stabilizing landslides, steep slopes, and the like in-place. According one aspect of the present invention, existing landslides and slopes that are steeper than their angle of repose (or angle of internal friction) are stabilized by structural members. That is, the structural members transmit a stabilizing force through the soil. The structural members work together with earth or rock anchors to form a system that resists the driving force of an active or potential landslide.

The structural members of the present invention are easily installable at remote locations. The soil stabilization system of the present requires little or no land area greater than the land area of the landslide or steep slope itself. However, additional area may be advantageously utilized, if desired.

The present invention specifically addresses and mitigates the above mentioned deficiencies associated with the prior art. More particularly, according to one aspect, the present invention comprises a method for stabilizing soil to inhibit movement thereof, wherein the method comprises placing at least one anchor in the ground and subsequently attaching a soil bolting device to the anchor.

The soil bolting device is a load bearing member which is generally disposed proximate the surface of the ground, preferable just beneath the surface of the ground. The soil bolting device is attached to the anchor such that soil between the anchor and the soil bolting device is compacted therebetween and thus substantially stabilized. Generally, the soil bolting device comprises at least one flange, plate, or other generally planar member such that it is capable of bearing a sufficient load from the soil so as to result in the desired compacting of the soil.

Thus, according to one aspect the present invention comprises a method for stabilizing soil, wherein the method comprises compacting soil between an anchor and a soil bolting device.

Attaching a soil bolting device to the anchor preferably comprises sliding a guide of the soil bolting device with respect to an elongated member of the anchor and attaching the soil bolting device to the elongated member of the anchor.

Attaching a soil bolting device to the anchor preferably comprises placing the soil bolting device over a rod of the anchor and tightening a nut onto a threaded portion of the rod.

Attaching a soil bolting device to the anchor preferably comprises sliding a tubular guide of the soil bolting device over a rod of the anchor and tightening a nut onto a threaded portion of the rod.

Placing at least one anchor in the ground optionally comprises placing a plurality of anchors in the ground, such as within comparatively stable soil and/or at least partially within bedrock.

The anchors are preferably self-advancing helical anchors. However, the anchors may alternatively be hard rock anchors, such as small diameter mechanical anchors, grout anchors, or resin anchors. Any desired combination of self-advancing helical anchors and/or hard rock anchors (of any desired type), may be utilized. In some instances, a single anchor is sufficient.

Each anchor is preferably placed in the ground such that the rod thereof is oriented at a predetermined angle with respect to the slope. For example, each anchor may be placed in the ground such that the rod thereof is oriented at an angle of between approximately 30° and approximately 90° with respect to the slope for slopes having a ratio of from approximately 1.5:1 to approximately 2:1. Preferably, each anchor is placed in the ground such that the rod thereof is oriented at an angle of approximately 45° with respect to the slope. Preferably, each anchor is placed in the ground such that the rod thereof is oriented at an angle of approximately 10° down with respect to horizontal.

Each anchor is preferably placed in the ground such that the rod thereof initially extends above the surface of the ground. Having the rod extend above the surface of the ground makes attaching the soil bolting device thereto easier.

However, each anchor may alternatively be placed in the ground such that the rod thereof is proximate the surface of the ground, but below the surface of the ground. As a further alternative, each anchor may be placed in the ground such that the rod thereof is substantially below the surface of the ground and an extension is attached to the rod such that the extension extends to a point above the surface of the ground or proximate the surface of the ground, but below the surface of the ground.

Optionally, the soil proximate each soil bolting device is compacted by moving each soil bolting device closer to its anchor. This may be accomplished by tightening a fastener of each soil bolting device, such as the fastener which attaches each soil bolting device to its anchor. For example, the nut which attaches each anchor to a soil bolting device may be tightened onto a threaded portion of the rod of each anchor. Preferably, a distal portion of each rod is threaded so a to facilitate such attachment of the soil bolting device thereto. However, those skilled in the art will appreciate that various other means of attachment are likewise suitable.

Alternatively, the soil may be compacted by advancing the anchor attached to each soil bolting device. If desired, the soil may optionally be compacted by both tightening a fastener of the soil bolting devices and by advancing the anchor.

Optionally, soil compaction proximate the soil bolting device is regulated by monitoring a pressure, torque, current, voltage, or other parameter of a motor, actuator, ram, or other device used to move the soil bolting device toward the anchor or used to advance the anchor.

As mentioned above, an extension may be attached to the rod of the anchor, so as to further define the rod. That is, the extension adds length to the rod, so as to provide a longer rod and thereby facilitate deeper positioning of the anchor.

If a portion of the rod or the extension extends above the ground, then that portion of the rod or the extension may be cut off such that no portion of the rod or extension extends above the surface of the ground. Generally, it is preferred that at least a few inches of soil cover the soil bolting device and any portion of the rod or extension extending therefrom. This provides a more aesthetically appealing installation and may enhance safety or utility by eliminating obstructions on or near the surface of the ground.

Typically, a depression in the ground will result from the installation of the soil bolting device of the present invention, especially if the soil bolting device is moved substantially toward the anchor and/or the anchor is advance substantially, so as to compact the soil proximate the soil bolting device. Optionally, the soil proximate the soil bolting device may be filled in, so as to substantially eliminate the depression.

According to one aspect of the present invention, a plurality of the soil bolting devices and/or anchors may be interconnected, such as via rods, bars, cables, or other structures, so as to enhance desired stabilization of the soil therebeneath. The structures used to interconnect the soil bolting devices can be either rigid or flexible. Optionally, a mesh may be laid upon the ground proximate the soil bolting devices and generally beneath the cables to further enhance soil stabilization. The mesh may comprise geogrid and/or woven fabric, for example.

Thus, according to one aspect the present invention comprises a device for stabilizing soil, wherein the device comprises an anchor and a soil bolting device attachable to the anchor.

The soil bolting device preferably comprises at least one plate. According to one aspect of the present invention, the soil bolting device comprises two plates formed at an angle of between approximately 30° to approximately 90°, preferably approximately 45°, with respect to one another. A guide tube is preferably formed along one of the plates.

At least one gusset is preferably formed to the two plates, so as to enhance a structural strength of the soil bolting device.

According to one aspect, the soil bolting device preferably comprises a plurality of side plates attached together so as to define a generally pyramidal structure and further comprises a bottom plate attached to the side plates. Each of the side plates and the bottom plate preferably has at least one opening formed therein.

According to one aspect, the soil bolting device comprises a single plate having a structure for attaching to the anchor formed therein or thereto. Preferably, the structure for attaching to the anchor comprises an opening formed in the plate, preferably proximate a center thereof, through which a rod or extension of the anchor can pass and be fastened, such as via a nut.

According to one aspect, the present invention comprises a system for stabilizing soil, wherein the system comprises a plurality of anchors and a plurality of soil bolting devices. Generally, the number of anchors corresponds approximately to the number of soil bolting devices. Typically, each anchor has a dedicated soil bolting device.

These, as well as other advantages of the present invention, will be more apparent from the following description and drawings. It is understood that changes in the specific structure shown and described may be made within the scope of the claims, without departing from the spirit of the invention.

BRIEF DESCRIPTION OF THE DRAWINGS

The invention and its various embodiments can now be better understood by turning to the following detailed description of the preferred embodiments, which are presented as illustrated examples of the invention defined in the claims. It is expressly understood that the invention as defined by the claims may be broader than the illustrated embodiments described below.

DETAILED DESCRIPTION

Figure 1:
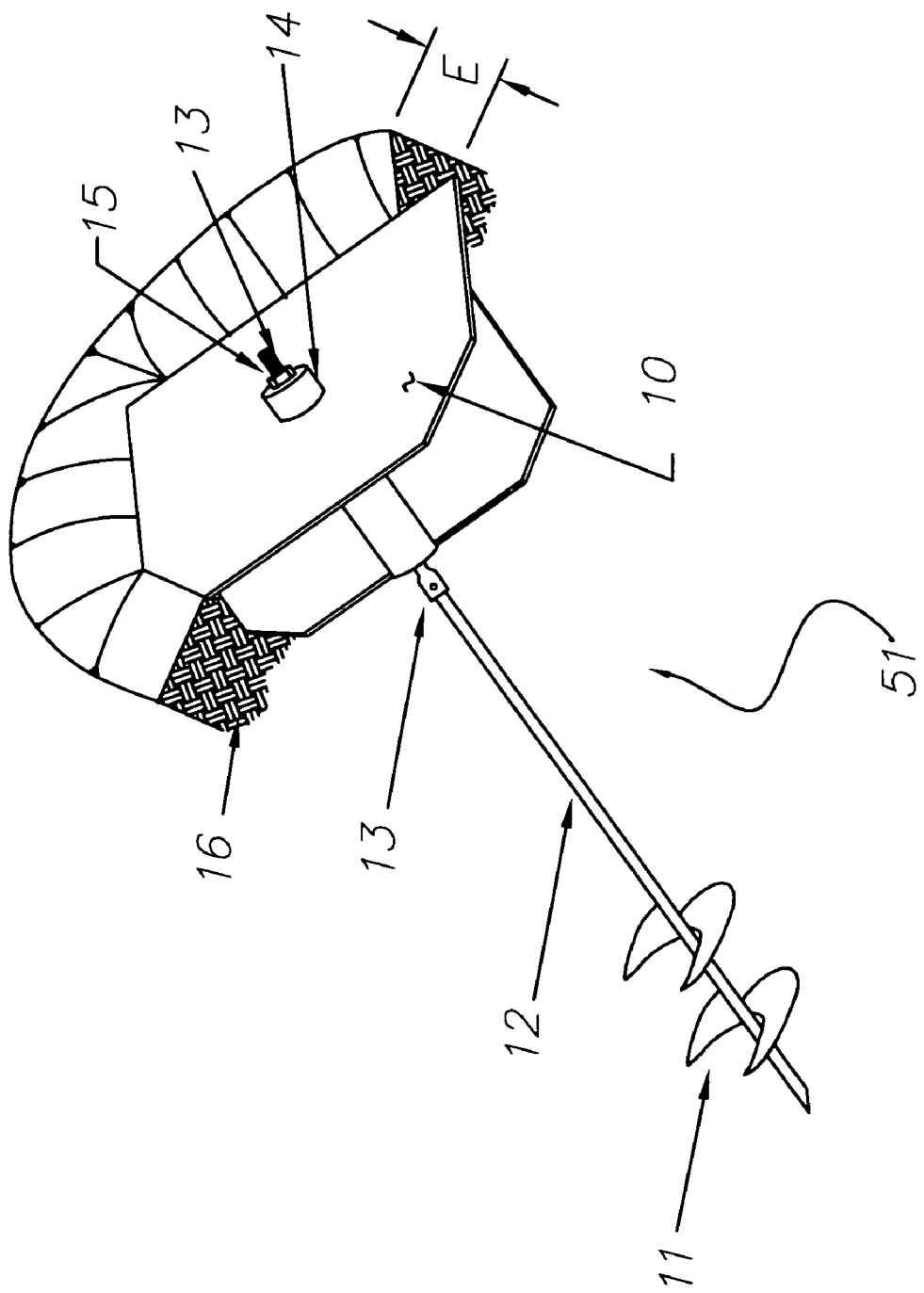
FIG. 1 is a semi-schematic perspective view showing an exemplary anchor and soil bolting device embedded into the ground surface according to the present invention.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed herein even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims therefore include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

Thus, the detailed description set forth below in connection with the appended drawings is intended as a description of the presently preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions may be accomplished by different embodiments that are also intended to be encompassed within the spirit of the invention.

According to the present invention, an easily installable system of anchors and load-bearing members for the stabilization of landslides, steep slopes and the like uses readily available engineering methods and construction equipment.

The present invention includes the use of load-bearing members in a process referred herein as soil bolting. According to the practice of soil bolting of the present invention, a soil bolting device is attached to a subterranean anchor and compresses or compacts soil which is disposed between the anchor and the soil bolting device. Thus, the soil bolting device comprises a plate, a combination of plates, or any other structure which has sufficient surface area and structural strength to effect such compression or compaction.

According to one aspect of the present invention, an anchor is secured into a stable layer of soil or rock. A rod extending from the anchor transmits a tensile force to the load-bearing member or soil bolting device, which is either tightened so as to compact the soil thereabout by tightening one or more bolts, nuts, or other fasteners, or alternatively by further advancing the anchor. The tensile force of the of the rod imparts a compressive force to the load-bearing member or soil bolting device, which is transferred to the soil mass to resist downward movement.

Additionally, the tightening or advancing operation normally tends to embed the load-bearing member into the soil. Embedding the load bearing soil bolting device densifies the soil immediately beneath the soil bolting device and thus prestresses the soil between the soil bolting device and the anchor. The prestressed soil between soil bolting device and the anchor acts as part of the stabilization system, thus enhancing the holding power of the system by adding a normal force to the potential or existing, sliding plane(s).

This new system uses fewer rods than a typical soil nailing system and does not rely upon the less predictable soil shear resistance around individual rods. According to the present invention, a correctly installed system can afford more support strength than a conventional retaining wall of equivalent area, can be installed more quickly, can be installed in remote locations, and can be utilized where poor foundation soils would frequently preclude the use of a retaining wall.

Typically, one or two rows of soil bolting devices are installed at engineered spacings along and near the base of a slope. The system is optionally buried, thus creating a natural look. Where poor bearing soils exist, the system employs a different load-bearing member, such as one including a mesh or woven material and/or a system of cables, to contain the soil mass.

Landslides of significant consequence are usually remediated through the knowledge and experience of a geotechnical engineer. Geotechnical engineers are familiar with stability analysis computer programs that allow tie-back loads to be modeled. This computer modeling provides the engineer with the means to quickly design the loads, angle of inclination, and spacing needed to achieve a target factor of safety. Additionally, the engineer estimates the anchorage capacity of the anchor using an appropriated factor of safety.

Based on the inventors' experience, the bearing capacity near the ground surface is the limiting design constraint of the system. The load-bearing members are usually loaded to the local bearing capacity of the soil to embed them. The safe working load of the anchor/rod/load-bearing member is usually well above the local bearing capacity of the surface soils.

Since the in-place stabilization of the present invention is on the slope itself, no additional space is needed. Additionally, the preferred installation is performed in a manner whereby the load-bearing members are embedded a short distance below the ground surface, thus rendering the system completely out of sight.

The present invention is illustrated in FIGS. 1-10, which depict presently preferred embodiments thereof.

Referring now to FIG. 1, an exemplary embodiment of the soil stabilization system 51 of the present invention is shown installed into the earth 16. According to the present invention, a soil bolting device 10 is installed over a previously installed anchor 11 and its associated shaft or rod 12 by aligning either the rod 12 or an optional threaded rod extension 13 with the guide tube 14 and sliding the soil bolting device 10 onto the extension 13 and then tightening nut 15. The soil bolting device 10 is driven into the soil 16 by further tightening the nut 15. The soil bolting device 10 is embedded a distance E into the surface soil 16.

One or more soil bolting devices 10 may be attached to a single anchor 11, such as by plural rods 12 and/or extensions 13 extending therefrom. Similarly, one or more anchors 11 may be attached to a single soil bolting device 10. Thus, any desired number of soil bolting devices 10 may be attached to any desired number of anchors 11.

The soil bolting device 10 may be attached to the rod 12 or to an extension 13 via a fastener such as nut 15, a bolt, a pin (which may, for example, pass transversely through a hole in the rod 13 or extension 13), via welding or adhesive bonding, or via any other desired fastener or methodology.

The extension 13 may be attached to the rod 12 via a threaded connection, via a pin, via welding or adhesive bonding, or via any other desired fastener or methodology. The extension 13 may be attached to the rod 12 prior to putting the anchor 11 into the ground or after the anchor 11 has been put into the ground.

Figure 2:
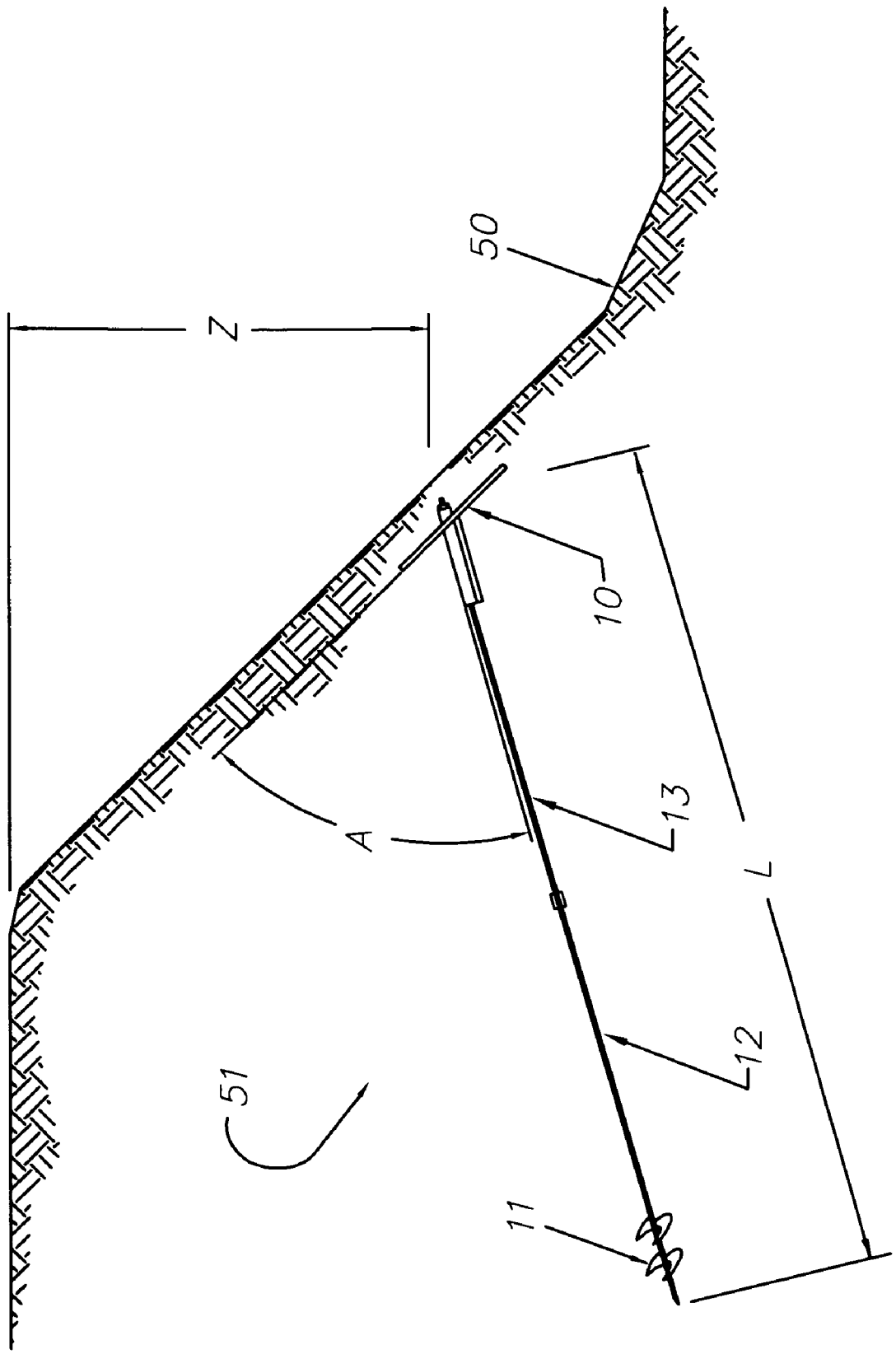
FIG. 2 is a side view of the installed soil bolting device and anchor of FIG. 1, showing a typical relationship thereof to an exemplary slope.

Referring now to FIG. 2, the orientation of the soil stabilizing system 51 with respect to the ground surface or slope 50 is shown. In a typical installation, a plurality of the soil bolting devices are aligned in a generally horizontal row along the slope 50, such that they are at approximately the same elevation. A plurality of such rows can be used to stabilize soil over a larger area, if desired. Indeed, the layout of the soil bolting devices depends substantially upon the layout of the soil being stabilized and any desired layout of soil bolting devices may be utilized.

The system is installed at an engineered distance Z down from the crest of the slope at a predetermined angle A with respect to the ground surface or slope. The distance Z is determined on a case-by-case basis, based on the geometry of the slope and soil/rock parameters using standard stability analysis methods. By trial and error, preferably using a computer program, the optimal location Z is determined using well known principles.

According to the present invention, the angle A can range from 30° to 90°, but an angle of 45° is generally preferred for slopes ranging 1.5:1 to 2.0:1 (horizontal to vertical). The attitude of the rod 12 is preferably at approximately 10° down from the horizontal.

The length L of the rod 12, the extension 13, and/or anchor 11 is that length which places the anchor 11 in stable soil or rock. That is, the rod 12, the extension 13, and/or the anchor 11 must be long enough to pass beneath the slip plane of the soil within which there are installed. Typically, length L will be between approximately 10 feet and approximately 25 feet.

Figure 3:
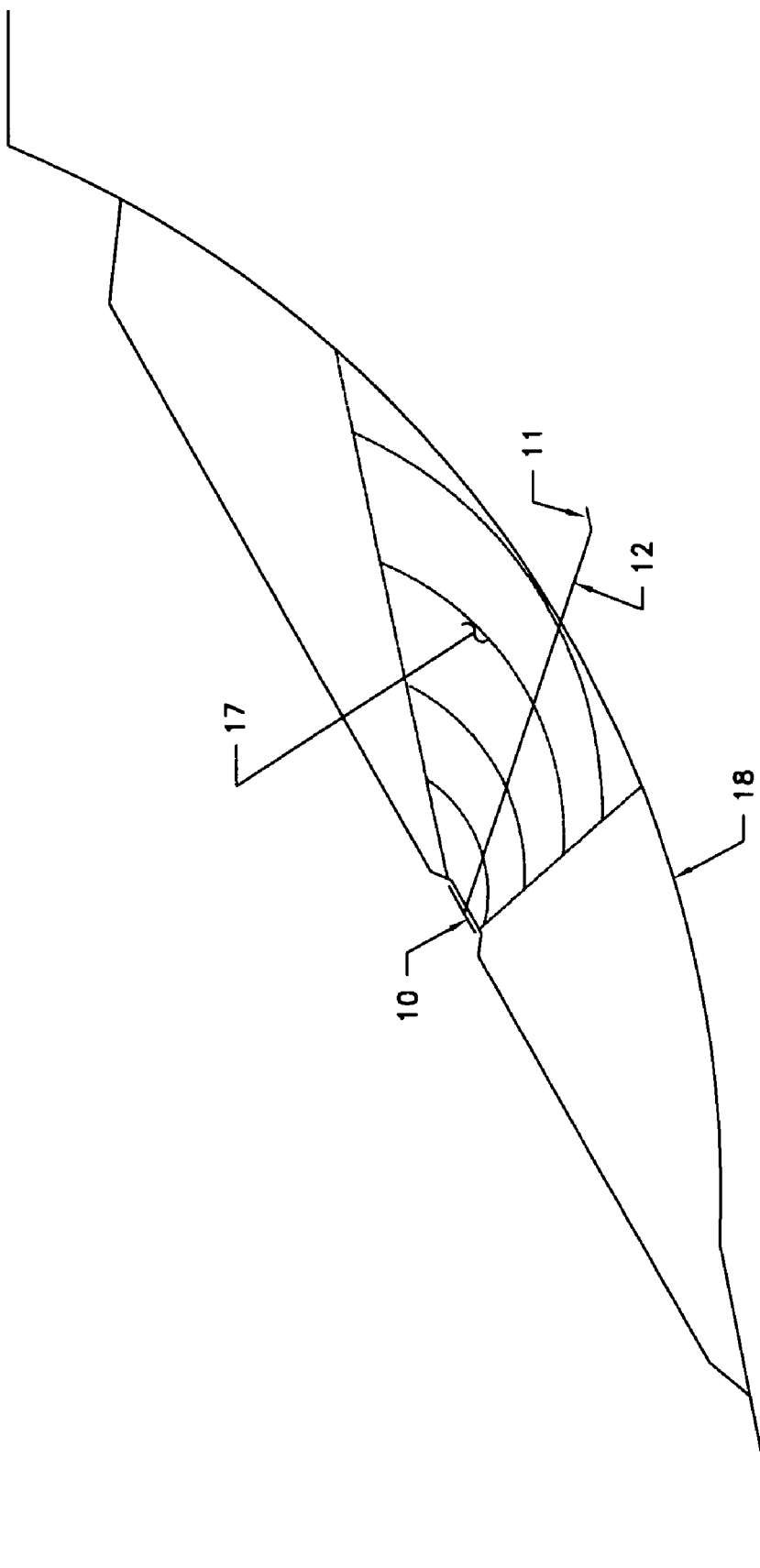
FIG. 3 is a schematic cross section through a landslide that has initially slumped and subsequently been stabilized with an anchor, rod, and load-bearing member showing the pressurized zone, depicted as dashed lines, projecting its area of influence onto the slip plane.

Referring now to FIG. 3, a landslide is schematically shown in cross section. This slice of the landslide is stabilized by installing at least one soil bolting device 10 connected to an anchor 11 by a rod 12 at a distance below the slip plane 18.

A prestressed zone 17 is created by embedding the soil bolting device 10. As the soil bolting device 10 is embedded, it mobilizes the passive resistance near the ground surface up to the point of the local bearing capacity of the soil. Further embedment will continue to densify a wedge of soil in advance of the soil bolting device 10 to a point of the general bearing capacity of the soil.

Mobilizing the full general bearing capacity of the soil is neither needed nor necessarily desired. Normally, the magnitude of the contact pressure at the soil bolting device 10 is estimated using the local bearing capacity of the soil and embedment is limited to punching shear without significant bulging of the ground surface. According to elastic theory and soil mechanics, the pressures drops in magnitude while spreading longitudinally and transversely. This spreading of the pressure is graphically depicted as lines in zone 17.

The prestressed zone improves soil strength of the intervening soil between the soil bolting device 10 and the slip plane 18 due to densification. The pressure on the slip plane 18 is at a maximum immediately after installation, which increases the pore water pressure forcing drainage and consolation with subsequent improvement of the natural shear strength on the slip plane. Increasing the normal force on the slip plane increases its frictional component of the shear strength. The intervening soil is precompressed minimizing creep related downward movement of the soil mass. These factors are difficult to quantify, and are not normally accounted for in design, but are considered as an additional reserve factor of safety.

Figure 4:
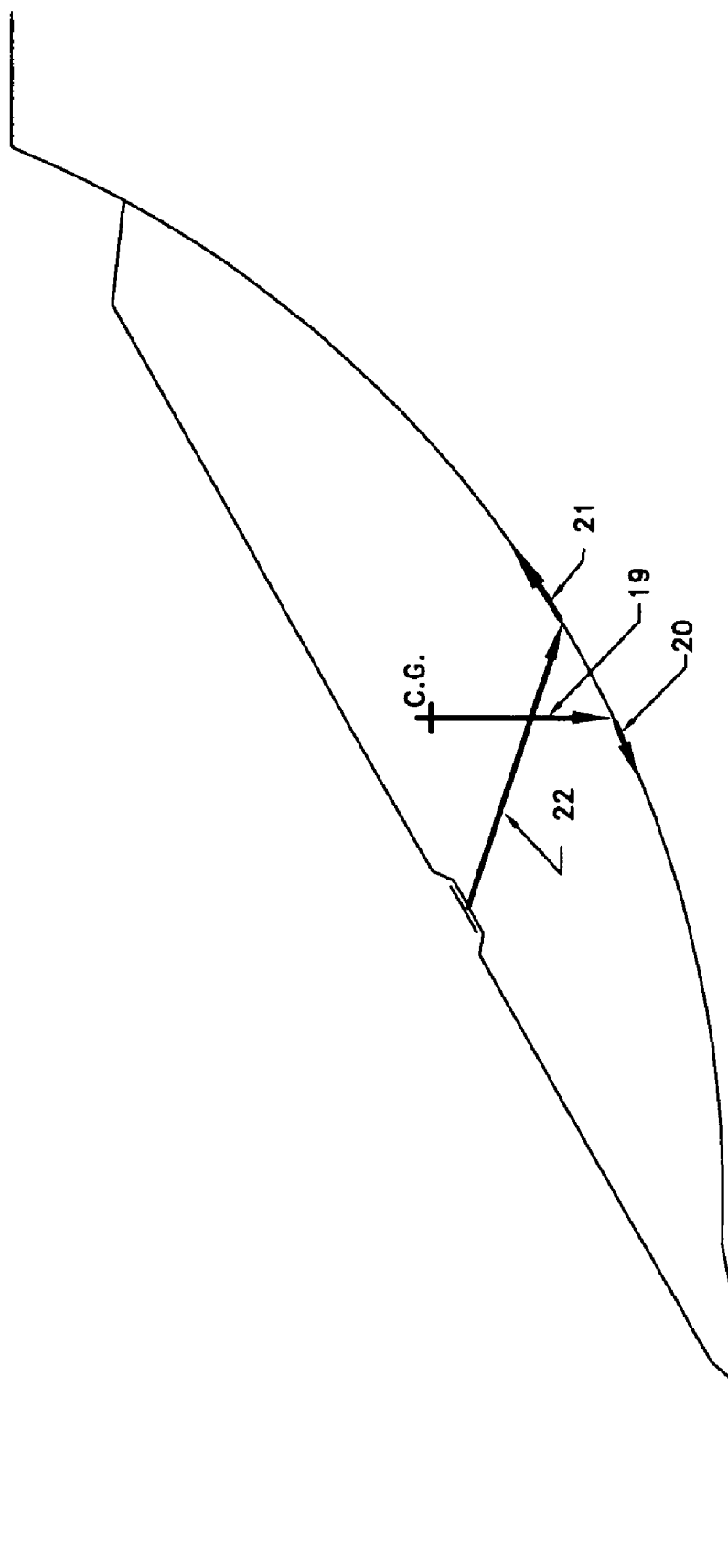
FIG. 4 is a schematic cross section through a stabilized landslide showing the resultant force due to the weight of the soil mass acting through its center of gravity (C.G.) and the resultant compressive force from the embedded soil bolting device normally acting below the C.G. and their driving and resisting component forces acting on the slip plane, respectively.

Referring now to FIG. 4, the resultant and component forces driving and resisting the landslide are shown. The weight of the soil mass 19, acting through the center-of-gravity (C.G.) tends to drive the slip downward and outward with a component of the force 20 acting on the slip plane. The resisting force 21 counters the driving force 20 with sufficient magnitude to arrest movement with a target factor of safety. The resisting force 21 is a component of the force 22 resulting from the embedment on the soil bolting device 10.

Figure 5:
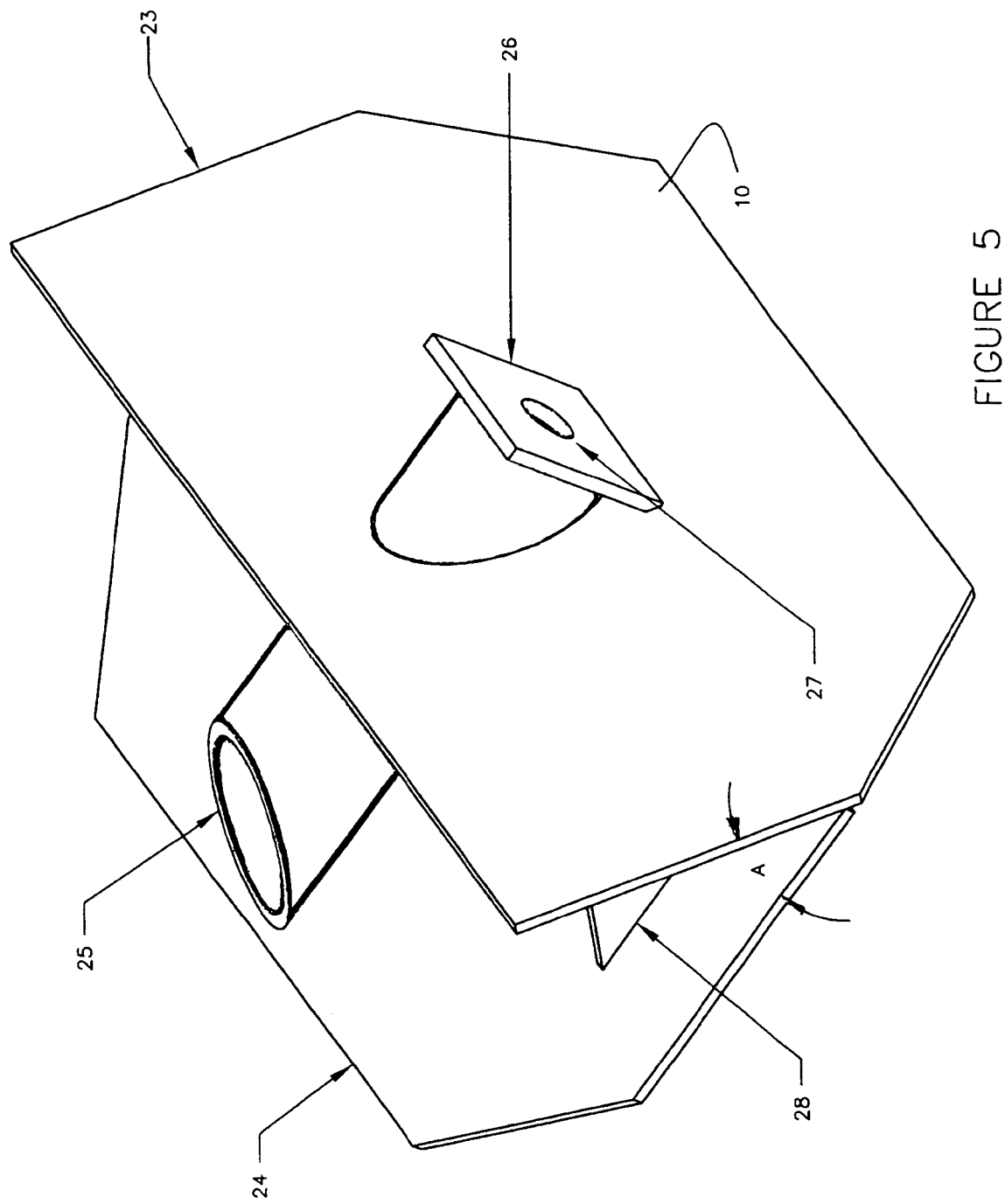
FIG. 5 is a perspective view of an exemplary soil bolting device (such as that of FIG. 1) according to the present invention.
Figure 6:
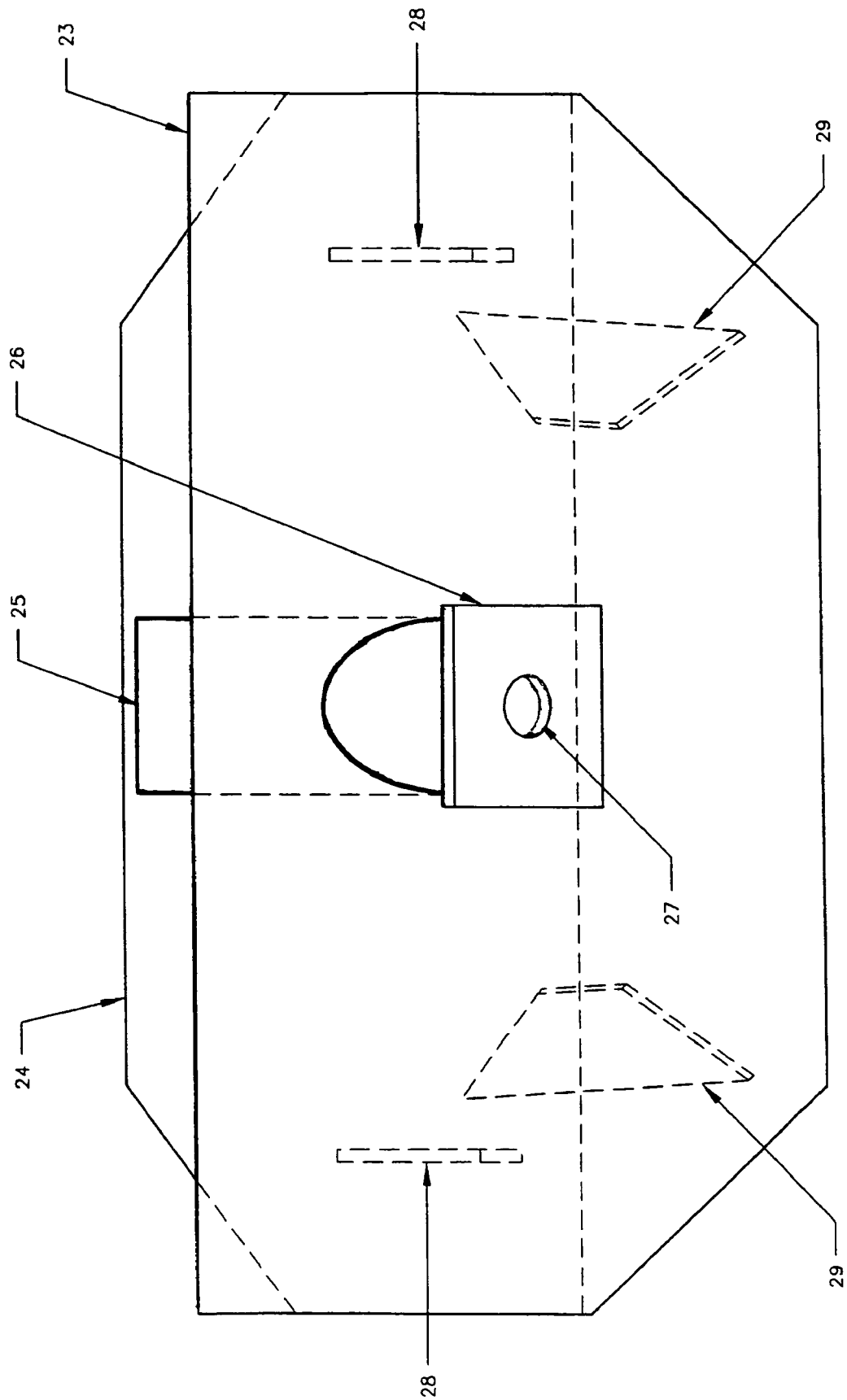
FIG. 6 is a top view of the soil bolting device of FIG. 5.
Figure 7:
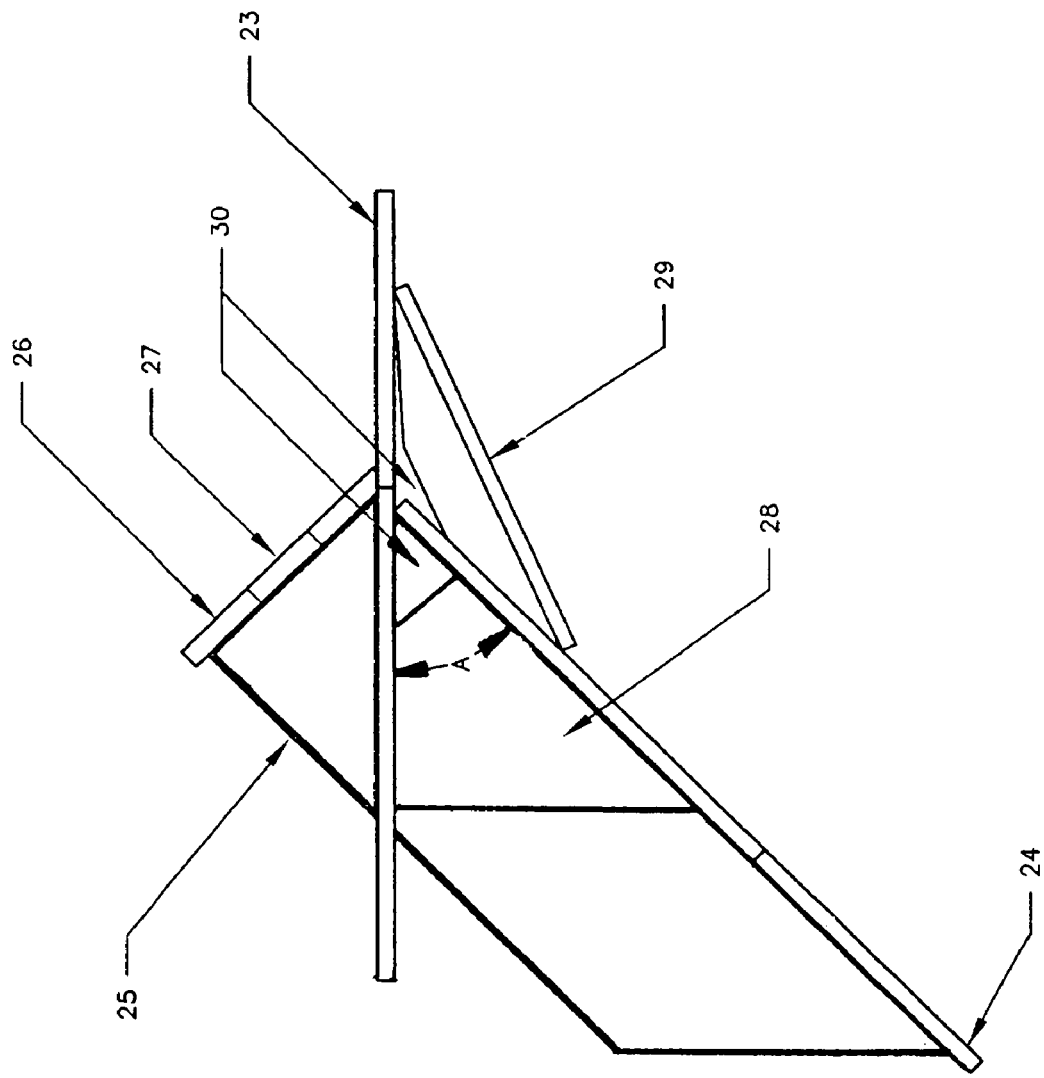
FIG. 7 is a side view of the soil bolting device of FIG. 5.
Figure 8:
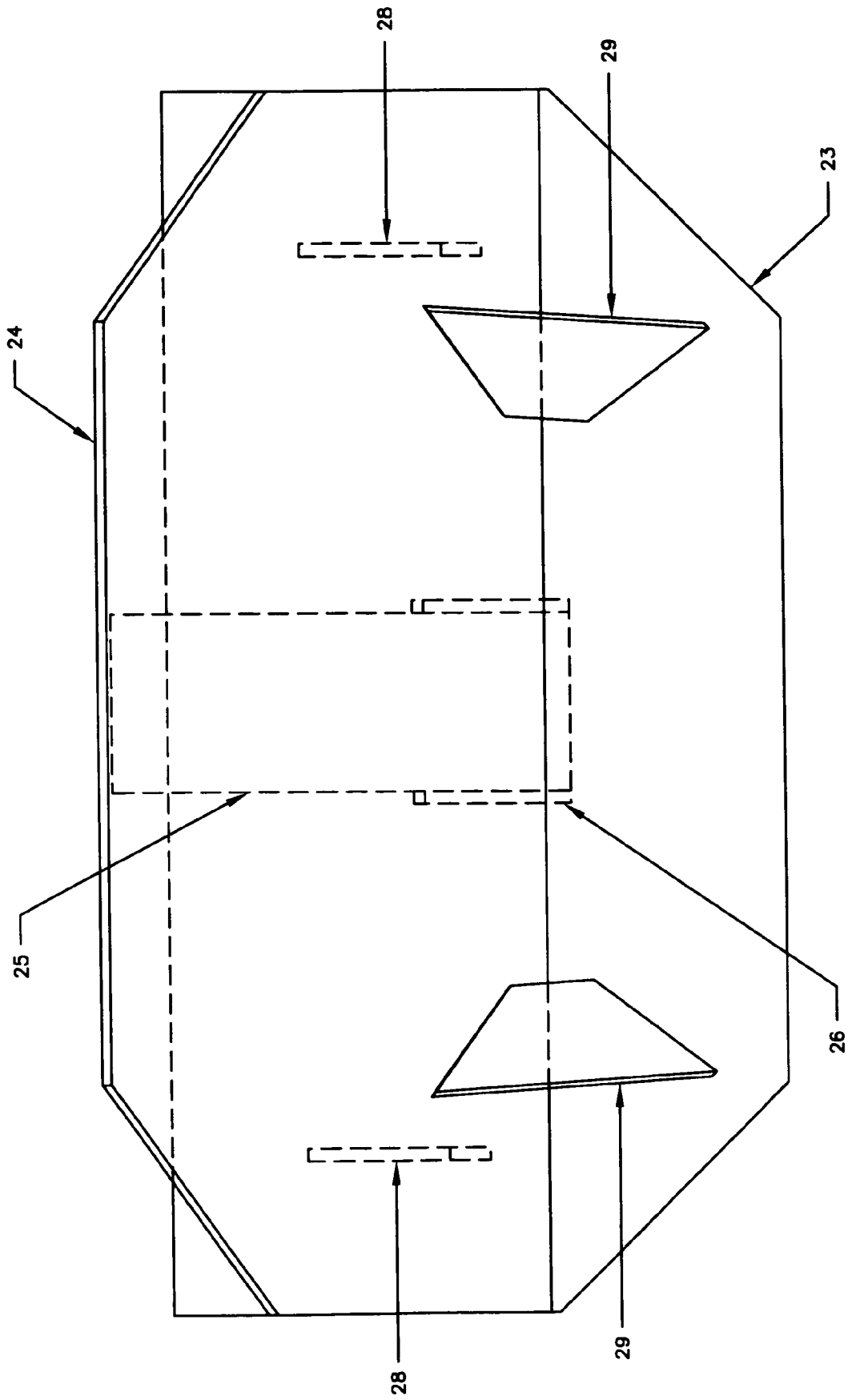
FIG. 8 is a bottom view of the soil bolting device of FIG. 5, better showing the orientation of the bottom gussets thereof.

Referring now to FIGS. 5-8, one exemplary embodiment of the soil bolting device 10 of the present invention is shown. The body of the load-bearing member generally comprises two plates 23 and 24 joined at an angle A (as shown in FIGS. 2, 5 and 7) with respect to each other.

As discussed in detail below, the two plates 23 and 24, as well as other components of the soil bolting device 10, are preferably formed of galvanized steel and joined via welding. However, those skilled in the art will appreciate that the components of the soil bolting device 10 may alternatively be formed of various different materials and joined via various different methods. For example, the two plates 23 and 24 may alternative be formed of aluminum and/or may be bolted together.

A guide tube 25 is attached to the body, preferably to both plates 23 and 24 thereof. A load transferring plate 26 is attached to the top of the guide tube 25. A hole 27 in the top of the plate 26 is to receive the rod 12 or the threaded extension 13 and plate 26 provides a reaction for the nut 15.

Preferably at least two struts 28 are provided to maintain the desired angle A by enhancing the structural rigidity of the body.

Preferably, at least two gussets 29 (best shown in FIGS. 7 and 8) are provided to bolster the flexural rigidity of the trailing edge of plate 23.

With particular reference to FIG. 7, openings 30 defined by the struts 28 and gussets 29 mitigate undesirable trapping of air during the galvanization process.

Figure 9:
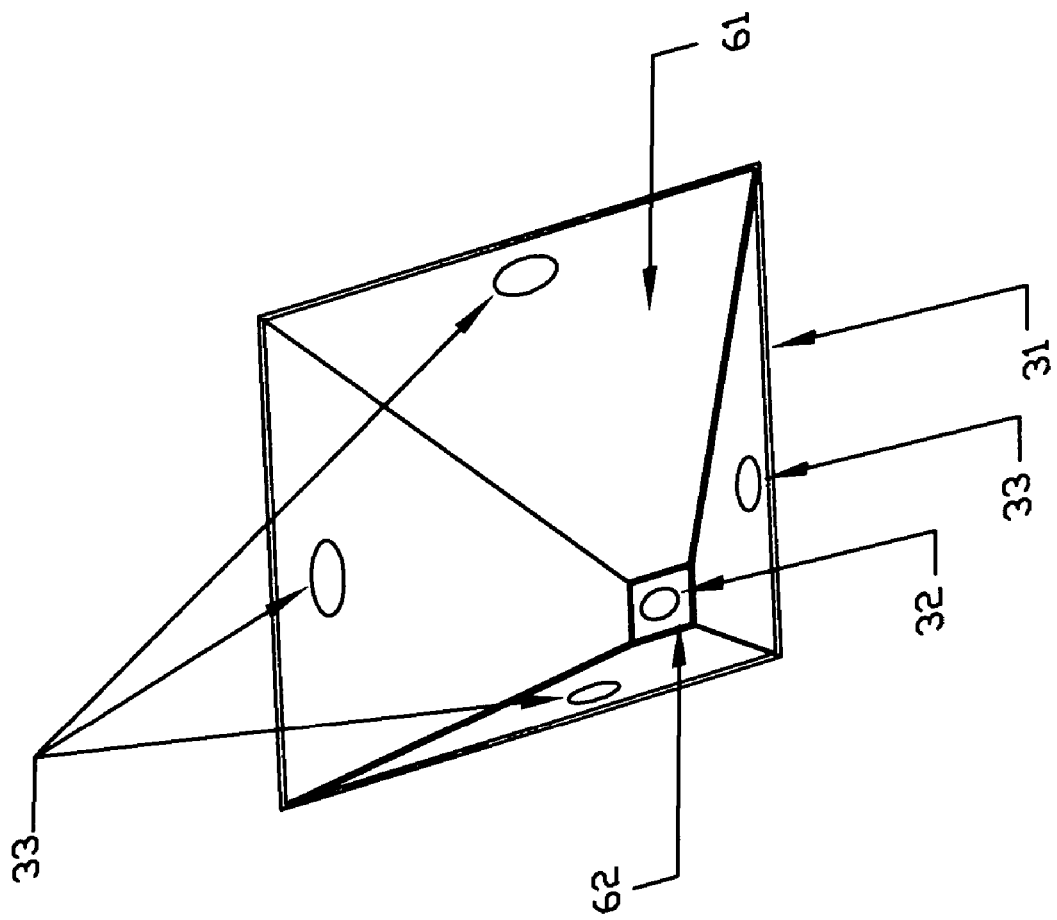
FIG. 9 is a perspective view of an alternative soil bolting device which is particularly suited for use where soft soils are encountered (in use, this soil bolting device is oriented with the small end down and is shaped somewhat like a frustum of a regular pyramid)

Referring now to FIG. 9, an alternative configuration of the soil bolting device 31 is shown. According to this alternative configuration, the body of the soil bolting device comprises at least three, preferably four, side plates 61 and one bottom plate 62 formed at an apex of the side plates 61 and extending therebetween, so as to generally define a truncated pyramidal structure.

The bottom plate preferably has a hole 32 through it to accommodate the threaded extension 13 and provides a reaction to the nut 15. Each of the side plates has a hole 33 through which a cable or connecting rod can be secured.

Figure 10:
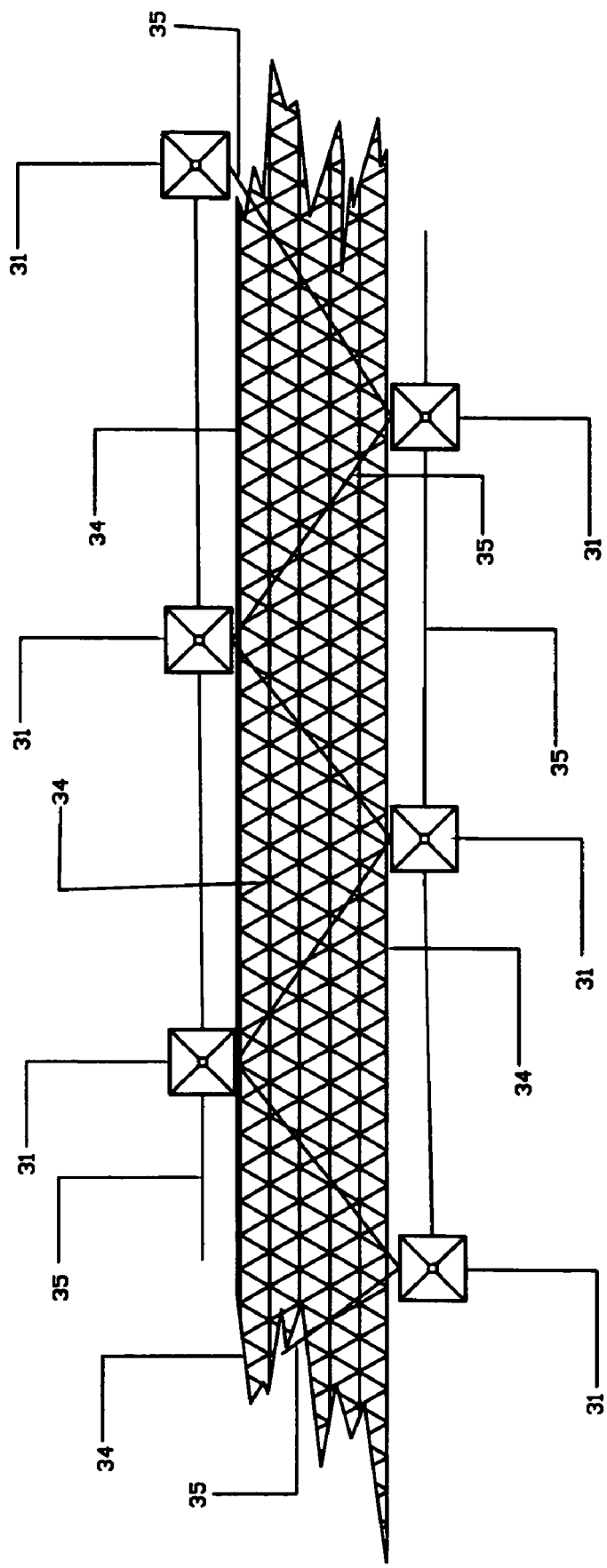
FIG. 10 is a schematic view of an installed system showing a typical staggered pattern of the soil bolting devices, wherein the soil bolting devices attach to a mesh material (geogrid or woven wire fabric) and cables.

Referring now to FIG. 10, a plurality of load bearing components acts as a system and is comprised of pyramid shaped soil bolting devices 31 of FIG. 9 and a mesh material 34 such as geogrid or woven wire fabric which is held in place with cables 35. Alternatively, soil bolting devices 10 of FIGS. 5-8 may be utilized. The cables 35 extend between adjacent soil bolting devices and generally cover the mesh material 34.

This soil stabilization system of the present invention tends to overcome the relatively low bearing capacity of soil associated with some landslides. The soil bolting devices 31 are preferable arranged in a staggered pattern at engineered locations and spacings as discussed above. This system generally requires a minimum of two rows of soil bolting devices 31 with a mesh material 34 between them and interconnecting cables 35 to transfer the load to the mesh material 34.

However, those skilled in the art will appreciated that various other configurations are likewise suitable. For example, a generally circular, oval, rectangular, square, or other pattern of soil bolting devices may alternatively be used.

The installation of the anchor 11, rod 12, threaded extension 13, and nut 15 for the alternate soil bolting device is the same as disclosed for typical soil bolting device 10. Tightening the bolt 10 embeds the alternate soil bolting device 31 causing the cables 35 to be tensioned and partially embedding the mesh 34. It is preferable to cover both types of soil bolting systems (including the cables and/or mesh) with a cover soil and vegetation.

The preferred material for all the components of the soil bolting devices 10 and 31, as well as the anchor 11, rod 12, and extension 13, is steel. The preferred method of cutting the shapes of the components of the soil bolting device 10 or 31 is stamping. The preferred attachment of the components is by welding. The preferred protective coating is hot dip galvanization. Other metals and high strength materials can be used in the fabrication of the soil bolting devices 10 and 31.

The soil stabilization system of the present requires little or no land area greater than the land area of the landslide or steep slope. However, additional area may be advantageously utilized, if desired. For example, some of the soil bolting devices 31 shown in FIG. 10, such as those at the left and right ends thereof, may be placed into more stable soil, so as to enhance the overall stabilization effect of the system.

The installation equipment typically includes a small backhoe fitted with a hydraulic motor attached to the end of the boom or a small air-track drill with enough torque to embed the surface treatment. One example of an installation is described in detail below.

Anchors are first installed. Self-advancing helical anchors are preferred and usually can penetrate an adequate distance into the soft weathered bedrock, if needed. If hard rock anchors are required, small diameter mechanical, grout, or resin anchors can be installed. The anchors and rods are oriented at a predetermined angle. After the anchor is advanced to a predetermined depth, the rods, or threaded extensions, extend a short distance above the ground surface.

Soil bolting devices are next installed. These load-bearing members are placed over the rods and aligned to allow the load-bearing surface to contact the ground evenly. The soil bolting devices are embedded further into the ground by torqueing (tightening) bolts on the threaded extensions or by further advancing the anchors.

A pressure gage in fluid communication with the hydraulic or air motor can be used to regulate the torque on the nut 15 or other fastener. In turn, the torque can be related to the contact pressure the soil bolting device has with the earth. By knowing the pressures at anchor refusal, the torque imparted to the soil bolting devices can be limited to just below that value to maximize the holding force of the soil. By monitoring and recording pressures, under or over torquing can be minimized adding a desirable level of quality control.

The rods or threaded extensions are preferably cut off just above the soil bolting devices. Since embedding the anchors dimples the ground surface, additional soil can optionally be placed over the soil bolting devices as mentioned above.

As discussed in detail above, an alternate load-bearing member comprises cables which interconnect the load-bearing members. The cables are placed over a mesh material such as geogrid, or woven wire fabric, to generate enough bearing area needed to adequately load excessively soft/wet soils that often exist near the toe of landslides. Also, this system should be considered when the surface soils are too soft to support the required resisting load without being place on impractically close spacings. Again, the mesh material spreads the resisting force over a lager area and thus requires less local bearing capacity of the soil. Additionally, the mash material acts to retain the soil.

Thus, according to the present invention, a method of installing a soil bolting system to stabilize landslides or steep slopes comprises installing a plurality of spaced soil or rock anchors into the earth at engineered locations, each of the anchors including an elongated rod and load transferring hardware adjacent to the lower embedded end of the rod; positioning a plurality of load-bearing structures adjacent to the anchors with the base thereof contacting the earth and presenting a bearing area; and tensionally coupling the earth anchors and load-bearing members in a manner that pulls the load-bearing members in opposition to the anchors to provide additional resisting force above the magnitude of the natural resisting force to a value greater than the driving force and in an opposite direction to the driving force, with an appropriate factor of safety, while the force tends to embed the load-bearing member creating a prestressed zone of pressurized soil between the load-bearing members and the anchorage, thereby increasing the normal force on frictional planes of weakness within the soil, and creating a denser soil mass above the planes of weakness and consolidating saturated fine grained soil on the planes of weakness.

Additionally the intervening soil is precompressed, thus minimizing creep related downward movement of the soil mass, and thereby increasing the bearing area to the greatest effective cross-sectional area of the prestressed zone, where it intersects the slip plane so as to spread compressive loads within the soil/rock mass and thereby maximizes the spacing of the load-bearing members and the area of influence in order to increase the holding power of the soil bolting system.

The spacing and size of the load-bearing members can be determined by standard engineering practice using stability analysis, anchor capacity and bearing capacity calculations.

The preferred configuration of load-bearing members and anchors, or components thereof, are typically small enough to be portable by one man. However, in some instances larger, non-portable items may be preferred.

The preferred installation equipment of the items is currently available small construction equipment, and if needed, portable equipment where access is limited to foot traffic. However, in some instances, larger installation equipment may be used.

Each load-bearing member with the anchor installed below the planes of weakness is self-testing in that the load-bearing member must be embedded into the ground surface without the anchor rod pulling out of the ground. The load-bearing members can be retested by this method subsequent to the installation.

The rods are tensioned to prestress the soil and can be either subsequently retensioned by tightening each the load-bearing members or anchors, or loosened and removed should their use be temporary in nature.

The load-bearing members, anchors, and rods once installed and the soil prestressed, are self-loading such that should the soil mass move downward, the load imparted to the soil increases thus increasing resistance to movement. The soil bolting system, once installed, is not visible at the ground surface thus preserving the natural appearance of the setting.

The method as described above, is in-situ stabilization wherein no earthen materials need to be removed from the immediate area being stabilized.

It is understood that the exemplary system and method described herein and shown in the drawings represents only presently preferred embodiments of the invention. Indeed, various modifications and additions may be made to such embodiments without departing from the spirit and scope of the invention. For example, the soil bolting devices need not be configured as discussed above. That is, the soil bolting devices may alternatively be elongate members, each attaching to a plurality of anchors. Those skilled in the art will appreciate that various other configurations are likewise suitable.

As one alternative, the soil bolting device may be pre-attached to the anchor, rod, or extension prior to putting the anchor into the ground. The soil bolting device may be either rigidly attached to the anchor, rod, or extension, or may be pivotally attached thereto. In either instance, the anchor may be advanced by turning the distal (above ground) end of the anchor, rod, or extension. The soil bolting device will likewise turn, if it is rigidly attached to the anchor, rod, or extension, and will tend not to turn if it is pivotally attached thereto. According to this alternative, the soil bolting device in combination with the anchor, rod, and/or extension resemble a large bolt which is driven into the ground.

Figure 11:
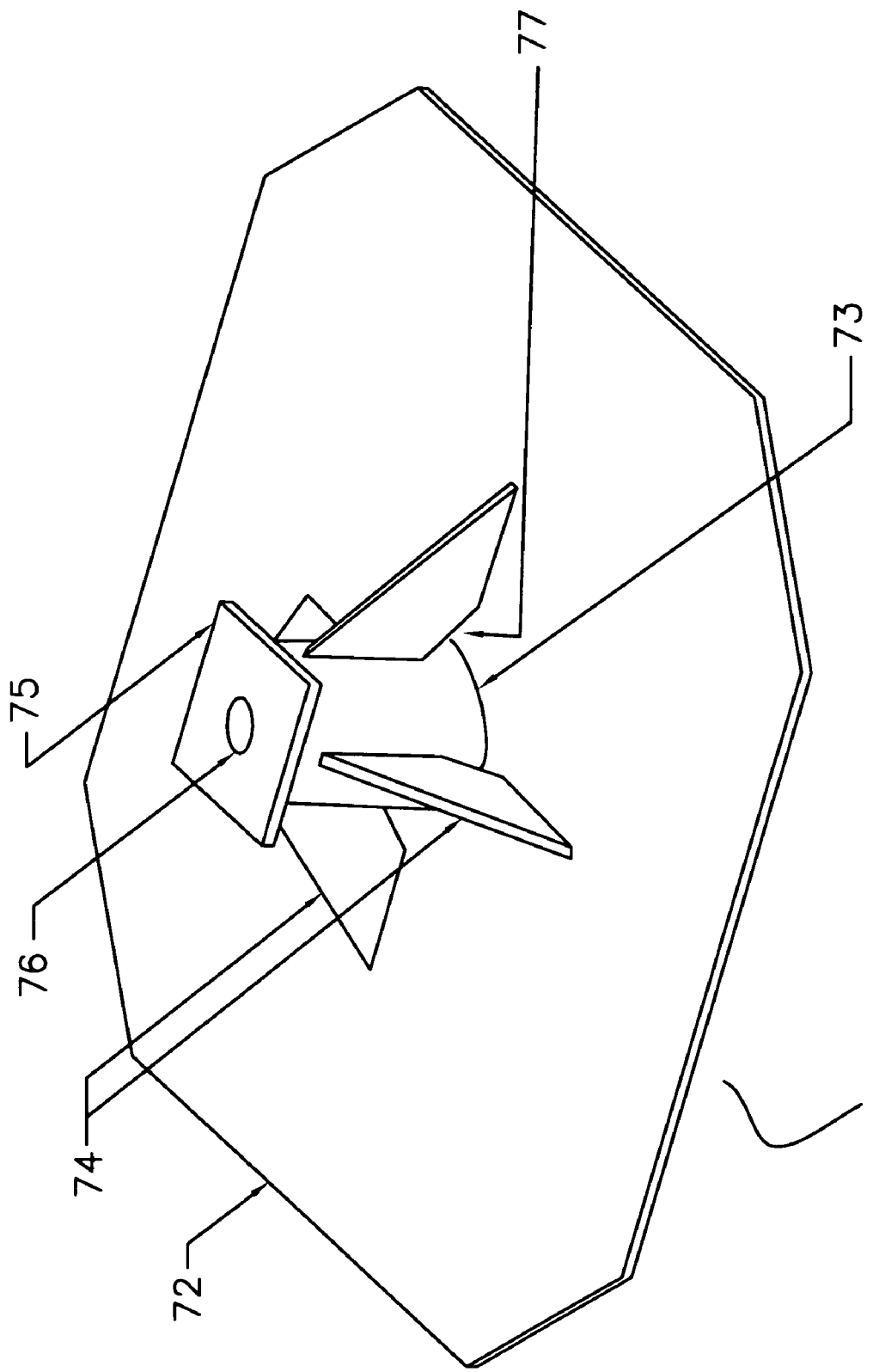
FIG. 11 is a perspective view of an alternative soil bolting device to that of FIG. 5, wherein the alternative soil bolting device provides approximately twice the bearing area with approximately the same weight as the device of FIG. 5.

FIG. 11 is a perspective view of an alternative embodiment with respect to the soil bolting device of FIG. 5. This alternative embodiment provides approximately twice the bearing area and has approximately the same weight as the device of FIG. 5.

According to this alternative embodiment of the soil bolting device 71, the body of the soil bolting device comprises at least one plate 72. A guide tube 73 is attached to the body 72. A load transferring plate 75 is attached to the top of the guide tube 73. A hole 76 in the top of plate 75 can receive the rod 12, or the threaded extension 13, as depicted in FIGS. 1 and 2.

A plurality, such as three or four, stiffeners 74 can be attached between plate 72 and tube 73 to bolster the flexural rigidity of the plate 72 and maintain the preferably perpendicular orientation between the plate 72 and tube 73. Openings 77 defined by the stiffener 74 and the body of the device mitigate trapping of air during the galvanization process.

This soil bolting device 71 is used where the installation angle is less critical than in the use of soil bolting device 10 of FIG. 2 and where additional bearing area is desired while maintaining an equivalent weight of material as in device 10.

Installation of the alternative embodiment is similar to that of the embodiment described above.

Thus, these and other modifications and additions may be obvious to those skilled in the art and may be implemented to adapt the present invention for use in a variety of different applications.

The invention claimed is:

1. A device for stabilizing slopes, the device comprising a first plate that is configured to be disposed upon a surface of a slope, to be advanced toward an anchor that is beneath a surface of the slope, and to transmit a stabilizing force through soil of the slope in a manner that stabilizes the slope; a second plate that is configured to extend into the soil of the slope and that is attached to the first plate at a non-perpendicular angle, the second plate being configured to inhibit rotation of the first plate; at least one gusset disposed on a first side of the second plate and attaching the first plate to the second plate; at least one strut disposed on a second side of the second plate and attaching the first plate to the second plate; and a guide tube non-pivotally attached to the first plate such that at least one of a rod and an extension of the anchor are rotatable within the guide tube, the guide tube being a hollow cylinder that is completely closed except at the ends thereof.

2. The device as recited in claim 1, further comprising a nut attachable to the anchor and abutting the first plate such that turning the nut advances the first plate toward the anchor.

3. The device as recited in claim 1, wherein the first plate is configured to cooperate with a self-advancing helical anchor to stabilize the slope.

4. The device as recited in claim 1, wherein the first plate is configured to cooperate with a rock anchor to stabilize the slope.

* * * * *